United States Patent [19]

Durrell

[11] 3,762,910

[45] Oct. 2, 1973

[54] METHOD OF MAKING NUTRIENT PROMOTING CULTURE

[75] Inventor: Harold Durrell, Decatur, Ill.

[73] Assignee: Henry Peterson, Cincinnati, Ohio; a part interest

[22] Filed: Jan. 5, 1972

[21] Appl. No.: 215,636

Related U.S. Application Data

[63] Continuation-in-part of Ser. No. 33,907, May 1, 1970, abandoned.

[52] U.S. Cl............................. 71/23, 71/6, 71/7, 71/9, 71/10, 71/24

[51] Int. Cl. .......................................... C05f 11/00

[58] Field of Search ...................... 71/6, 7, 10, 23, 71/24, 9

[56] References Cited

UNITED STATES PATENTS 1,606,015 11/1926 Blackwell................................ 71/6

FOREIGN PATENTS OR APPLICATIONS 211,322 2/1924 Great Britain......................... 71/10

OTHER PUBLICATIONS

"For the Suburban Gardener;" Organic Gardening and Farming; Vol. 6, page 26, Oct. 1959.

*Primary Examiner*—S. Leon Bashore
*Assistant Examiner*—Frederick Frei
*Attorney*—William B. Noll et al.

[57] ABSTRACT

This invention covers a process for making a nutrient-promoting culture or soil conditioner for application to natural soil and other media employed in agricultural and horticultural operations by utilizing a controlled sequence of natural organic reactions involved in the process of reduction of plant foliage to a nutrient-promoting culture.

6 Claims, No Drawings

METHOD OF MAKING NUTRIENT PROMOTING CULTURE

RELATED APPLICATION

This application is a continuation-in-part of Ser. No. 33,907, filed May 1, 1970, entitled "Process For Making Nutrient Promoting Culture", and now abandoned.

BACKGROUND OF THE INVENTION

Agricultural science represents perhaps one of the oldest sciences known and practiced by man. Broadly speaking, this may include all the efforts by man, both past and present, to improve the efficiency of the growing cycle, production, quantity, food value, size, etc., of a given living plant. One of the specific areas to which man has directed his efforts has been in the provision of conditioning the soil.

Heretofore, this endeavor was approached by adding nutrients to the soil giving life to the growing plants. However, none of these prior art procedures were such as to realize or utilize the full potential of the life giving soil. That is, such soil has locked-in nutrients which could be used by the growing plants, but before enjoying same, they must be converted from a passive to an active or ionic state.

The optimum situation in soil conditioning is one wherein the additive to the soil will continuously, through a cyclic action, generate new soil nutrients as well as converting said nutrients from the passive to an active state. The present invention accomplishes the latter by a method which includes a controlled sequence of natural organic reactions to reduce plant foliage to a nutrient-promoting culture. One major factor which will become more apparent from the description hereinafter is the control placed on the said sequence. That is, without such control, the full potential of the soil conditioner characteristics of the culture is not realized.

BRIEF SUMMARY OF THE INVENTION

In the practice of this invention, a method has been found for making a nutrient-promoting culture by a controlled sequence of natural organic reactions. The sequence comprises a plurality of stages or steps which include among other steps the following; establishing an open trench in soil which has been inoculated with rotting bacteria. This is the typical fertile soil found in non-arid areas.

After preparing such a trench, a quantity of foliage is placed in the trench and permitted to become degraded and form a slurry. The degrading action will be evidenced by the release of carbon dioxide from the trench area to the atmosphere. Said carbon dioxide results from the selective preference exerted by the biologicals on the excess of carbohydrates as the dominant energy source.

After a slurry has formed, it is transferred to a container to which has been added water containing carbonates selected from the group consisting of calcium and magnesium. Normally well water will suffice for this as said water is generally high in the specified carbonates. The material in the container is periodically checked until the ionization characteristic of pH of the mixture indicates that an equilibrium has been established and no more colloids are being produced. At this point, the mixture is removed and filtered so as to separate the unreacted material while collecting the filtrate. Finally, the filtrate is aged several days up to a week until the pH is again stabilized, i.e., equilibrium reached. This stabilized filtrate thus comprises a nutrient-promoting culture which when applied to earth growing or potted plants will continuously regenerate and/or convert molecular nutrients to the elemental reaction form needed for growth by the plants.

DESCRIPTION OF THE PREFERRED EMBODIMENTS

Before considering the details of this invention, but more so to appreciate its contribution to agricultural science, a review of the natural cycles occuring within the growth providing soil is in order.

The fertility demands of growing plants are best approached from a colloido-biological viewpoint. For instance, soil fertility is largely dependant upon bacterial activity. Hundreds of species of bacteria are present in soils, the nature and extent of which depends upon environmental conditions, such as favorable moisture, ionic balance, temperature, available energy sources, and degree of aeration. The soil flora includes aerobic and anaerobic, proteolytic and carbo-hydrate splitting organisms which are capable of bringing about decomposition and decay. In addition it includes bacteria which reduce nitrates to nitrites, bacteria which utilize the nitrogen of the air and ammonia, forming nitrates, and bacteria which utilize sulfur, iron, phosphorus, manganese compounds, and the whole realm of minerals contributing micro-nutrients to the fertility complex. The same is true of biologicals, other than bacteria. All these biological reactions evolve complex molecules whose components must be ionized to become available nutrients. This ionization is the entire function of the several colloidal complexes.

The constant withdrawal of nutrients from the soil by leaching and plants subject to cropping would soon lead to total depletion of soil nutrients were it not for the whole ramification of micro-organisms continually at work replenishing the supply. And this depletion exerts a corollary effect on the essential micro-organisms unless a procedure is inaugurated to maintain them at the optimum concentration. The reduction in available fertility elements of any soil, even under optimum cultivation methods, is well documented in the prior art and need not be discussed in further detail here. Nevertheless, in view of the critical problems involved in the detrimental conditions imposed in the soil by continuous cropping, it is obvious that the availability of a readily applied and economical program of renewal and maintenance of the all-important biological population of crop-producing soils will be of undeniable advantage. This is particularly true when the remedial inoculating media is the product of a normal natural cycle conducted without extraneous artificial stimulation, which could only result in factors unstable when exposed to natural environment. The resulting product of this invention is an organic broth, produced in a completely natural organic environment, controlled only by the maintenance of optimum ambient conditions and the withdrawal of dominant specific energy sources between the several stages when these sources have induced reactions to the desired end. The latter permits the created energy sources to promote further desirable reactions.

STEP I

Initially, a hole or trench of optimum dimensional characteristics is dug. While not desiring to unduly limit this invention, a typical trench may be approximately 20–24 inches wide by 24–30 inches deep to provide uniform access of reacting biologicals to the entire mass without the segregation of discrete reactions in remote zones. Into the trench lush foliage crop, such as grass cuttings, and the like, which have been harvested in prime condition, are introduced. The foliage should be tamped into place sufficiently to prevent the inclusion of isolated lenses of entrained air, permitting only the uniformly distributed air to remain in the compacted foliage mass. Intimate contact of the foliage with the earthen sides and bottom of the trench should be provided in order to permit intimate inoculation by soil borne biologicals.

The top of the mass is provided by a cover, which may consist of a two-by-four wooden frame, adequately braced to provide rigidity, and so dimensioned as to provide from one-half inch to three-quarter inch clearance from the earthen sides of the trench, the bottom or contact side to be covered by a covering of heavy gage plastic, secured to the frame. During the aerobic reaction, involving the entrained air in the foliage mass, the total volume of the material will shrink in volume as the mass becomes liquified to slurry consistency, until a loss of approximately 40 percent by volume is realized. As the mass is in a semi-fluid state, this loss will be reflected in only the vertical dimension. It is the function of the cover to follow this shrinkage, and provide a seal against atmospheric intrusion and the admission of further atmospheric oxygen.

During the initiation of the aerobic decomposition reaction, supported only by the entrained air in the foliage mass, the temperature will raise to approximately 20° to 30° Fahrenheit above the ambient, until the oxygen supply is exhausted. The peripheral clearance between the cover and the vertical sides of the trench provide adequate venting space for the gaseous products of the initial reaction, and will adequately seal against admission of further ambient atmosphere.

When the oxygen available to the reaction is exhausted, the temperature elevation will tend to recede to the ambient level, somewhat above atmospheric as the mass is well insulated against heat loss by the soil and top confines.

After an average interval of approximately three weeks, dependent upon climatic and soil temperatures, the semiliquid slurry which results from the initial aerobic and subsequent anaerobic decomposition will be ready for introduction into the second stage of the process.

STEP II

At the completion of said reaction, a measured quantity of said slurry is introduced to one or more containers on a fixed batch basis. To said quantity of slurry, water containing carbonates selected from the group consisting of calcium and magnesium is added. For convenience, the latter may be well water which has a considerable content of said carbonates. Again, while not intending to unduly restrict the invention, approximate quantities of materials are as follows; for each cubic foot of slurry, approximately 10 cubic feet of carbonate containing water is used.

This combination results in the dilution of the initial dense slurry to a relatively free-flowing mash consistency subject to mixture and dispersion.

In this stage there is a three phase system. The slurry composes one phase wherein decomposition is taking place toward the formation of humus material, the water in which the humic material of colloidal proportions will become dispersed, and the humic colloids which have been separated from their course in the slurry by agitation to receive protective dispersion in the water, safe from further degradation by enzymic digestion to mineral salts. Hence it is important that the material in the drum receive agitation at intervals to separate the humic material of colloid dimensions to protective dispersion in the fluid phase. Such agitation should be accomplished at about 24 hour intervals.

During the intervals between agitating by stirring, the solids will float toward the top of the drum, forming a dense semi-solid plug of black humic material in which the anaerobic biologicals continue the decomposition reaction with the formation of further humic colloid material to be dispersed at the next agitation. This reaction will continue for a period of about 6 days, when maintained at a temperature of about 80°F ± 10.

Daily determinations of the pH as an index of the hydrogen ion concentration of the liquid are made. Early in the stage these determinations will vary slightly from the medium pH. This elevation is due to the concentration of mineral salts initially present from the previous biological decomposition reaction, and the lack of colloids in the early part of the cycle. As the quantity of colloids increases through the cycle, and tend to exert their inherent cation exchange reaction, this will decrease gradually toward about a medium of 7.0 pH. When three successive determinations demonstrate the descent of the pH index has ceased, it is assumed that the colloids have increased in quantity until they have finally created a dynamic equilibrium in the system, and the reaction has ceased as far as the creation of further colloids is concerned. This then indicates the completion of the second stage. The interval involved in the last three pH determinations is about 48 hours.

After this stage in the process is attained, the solids material other then the dispersed colloids is removed from the liquid phase by gravity filtration. However, before filtration is effected, the solid plug at the top of the drum is removed, half of which is put into the following batch, and the other half returned to a trench being loaded with fresh material. The filmas of finer solids from the filter screen are retained in the drum to be incorporated with the next batch in line.

Subsequent to the filtration operation, the fluid filtrate bearing its load of dispersed colloids is pumped to another set of drums or containers for the final stage.

STEP III

This step, like the above, produces (1) an increase of the population of micro-biologicals pertinent to the progressive reaction, (2) an addition to the solubles previously organized in the liquid phase, and (3) a progression in the colloidal content. A portion of the latter colloids assume mechanical characteristics as a gel subject to ready dispersion by a minimal agitation. This condition is the result of a degree of super-saturation of some component of the organic reactions involved. Additionally, this provides a media readily subject to peptization within the soil extract upon dilution. It is resistant to syneresis within the limits of even abnormally intense salts concentration, and provides protection to the lyophobic colloids from synersis, which would otherwise occur irreversibly by reaction with the salts.

The final pH is an index of the extent of cation saturation of the colloid complex. The higher the pH, the higher is the corresponding saturation.

A quantative index is available as to the colloid content of the system. The colloid, similar to the salt, will give an electrical conductivity index similar to the case with dissolved salts in solution. The conductivity index in millemhos per centimeter increases in some direct proportion to that of the colloid content in the dispersed state. This factor, along with the visual factor of density of black coloration to opaque are the indices of the quantity of colloids involved in the dispersion.

As time is an element in the equilibrium between the inner phase colloids with their adsorbed cations, and the outer phase solute with its dissolved material, several days to a week are involved in this process, the completion being demonstrated by an equilibrium in the successive daily pH determinations.

The resulting aged filtrate is a nutrient-promoting culture characterized as follows:

A culture offering a full and viable complement of organic elements necessary to accomplish the reduction of natural and chemical molecules to the basic ionized plant nutrients, which when introduced to a soil environment will increase.

An adequate supply of nutrients as energy sources available to the promotion of increased progressive reaction in the soil climate.

An ionized lyophilic colloidal complex capable of performing base interchange reactions important in maintaining optimum ionic balance in the soil extract.

At this juncture it might be helpful to demonstrate this procedure further by means of a specific embodiment; however, this is merely exemplary and is not intended as a limitation thereon.

EXAMPLE

A trench, having a depth of about two and one-half (2 ½) feet and a cross section of six (6) feet by two (2) feet, was dug in fertile soil and filled with fresh grass cuttings. Said cuttings were then tamped into place to prevent the inclusion of isolated lenses of entrained air.

A somewhat flexible cover was placed over the grass filled trench to minimize the introduction of oxygen from the atmosphere to thereby assure a substantially anaerobic degradation.

During the ensuing period of about three weeks, the following observations were made:

1. Total volume shrank (about 40%) resulting in a liquified slurry; the flexible cover remaining adjacent the degrading mass to provide a seal against atmospheric intrusion by oxygen.
2. There was a temporary temperature rise of about 25°F above ambient temperature, but it receded during end of period.
3. After about three weeks, the trench produced about 1,600 pounds of slurry, sufficient to ultimately yield about 2,000 gallons of finished product.

The slurry was then transferred on the basis of about seven (7) gallons, equal to about fifty (50) pounds, to individual fifty five (55) gallon containers. The containers were filled to near capacity with well water containing carbonates of calcium and magnesium, and periodically agitated, i.e. at about twenty-four (24) hour intervals.

This second, stage period lasted about six (6) days with the end point being determined by the stabilization of the ionization characteristic. That is, daily reading on the pH of the solution were made until stabilization or equilibrium was reached. Initially the pH was about 8.0, then it dropped and stabilized at about 7.0.

After filtering the solids from the liquid, the liquid from each container was transferred to another set of containers for final aging. Here the filtrate was permitted to age for a period of about one (1) week, during which times regular pH determinations were made. On a graph of pH vs. time, the reading would be characterized by an initial drop from a starting point, then a rise to a value above said starting point with finally a leveling out at some relatively constant value. Reaching the said constant value or equilibrium signaled the completion of the process. Typical pH readings for the aging process are, initial pH = 7.0, low point pH = 5.8, and equilibrium pH level = 8.2.

While the description above has been directed to the preferred embodiment, it is not intended that the invention be so limited. I intend to be limited only by the scope of the claims to follow.

I claim:

1. A method for making a nutrient-promoting culture by a controlled sequence of natural organic reactions under substantially anaerobic conditions, said method composed of a plurality of stages wherein said natural organic reactions are controlled within said sequence, said sequence comprising the steps of:
   a. establishing an open trench or similar means in the earth, the bounding area of which is soil inoculated with rotting bacteria,
   b. placing a quantity of foliage therein under conditions permitting said foliage to become degraded and form a slurry, covering said foliage to substantially preclude the intrusion of fresh oxygen into the foliage and to permit the degrading process causing the release of carbon dioxide to the atmosphere,
   c. transferring said slurry to a container and adding water thereto, said water containing carbonates selected from the group consisting of calcium and magnesium, wherein decomposition continues resulting in the formation of a humic colloid material,
   d. periodically agitating said slurry to disperse said humic colloid material therein, while determining the pH of said slurry until equilibrium is reached therein, said equilibrium indicating the end to the formation of additional humic colloid material,
   e. filtering said slurry to remove the unreacted material and collecting the filtrate containing the dispersed humic colloid material, and
   f. aging said filtrate until the pH has again reached equilibrium, whereby said filtrate comprises a nutrient-promoting culture.

2. The method claimed in claim 1 wherein said carbonate containing water is natural well water.

3. The method claimed in claim 1 wherein a portion of the filtrate from step (e) is retained and mixed with the slurry and water of step (c).

4. The method claimed in claim 1 wherein said degrading process takes from 15 to 30 days.

5. The method claimed in claim 1 wherein the ratio of said water to slurry is about 10 to 1 by volume.

6. The method claimed in claim 1 wherein said filtrate resulting from said step (e) is aged for a period up to about 7 days.

* * * * *